United States Patent [19]

Quinn

[11] Patent Number: 5,272,010
[45] Date of Patent: Dec. 21, 1993

[54] COLOR BINDING MECHANISM FOR CONTACT LENSES

[75] Inventor: Michael H. Quinn, Valparaiso, Ind.

[73] Assignee: Wesley-Jessen Corporation, Chicago, Ill.

[21] Appl. No.: 768,910

[22] PCT Filed: Apr. 12, 1990

[86] PCT No.: PCT/US90/01868

§ 371 Date: Oct. 1, 1991

§ 102(e) Date: Oct. 1, 1991

[87] PCT Pub. No.: WO90/12840

PCT Pub. Date: Nov. 1, 1990

Related U.S. Application Data

[63] Continuation-in-part of Ser. No. 338,077, Apr. 14, 1989, abandoned.

[51] Int. Cl.[5] .............................................. B32B 9/04
[52] U.S. Cl. ........................................ 428/411.1; 8/507; 8/509; 351/162; 427/164; 428/500
[58] Field of Search ................ 8/507, 509, 552, 557, 8/602, 637.1, 661; 351/162; 428/411.1, 500; 427/164

[56] References Cited

U.S. PATENT DOCUMENTS

| | | | |
|---|---|---|---|
| 3,900,672 | 8/1975 | Hammond et al. | 428/334 |
| 4,082,894 | 4/1978 | Yoshida | 428/335 |
| 4,120,570 | 10/1978 | Gaylord | 351/40 |
| 4,127,682 | 11/1978 | Laurin | 427/164 |
| 4,127,697 | 11/1978 | Laurin | 428/412 |
| 4,158,089 | 6/1979 | Loshaek et al. | 526/264 |
| 4,182,802 | 1/1980 | Loshaek et al. | 526/264 |
| 4,228,269 | 10/1980 | Loshaek et al. | 526/346 |
| 4,242,413 | 12/1980 | Iwahashi et al. | 428/412 |
| 4,332,859 | 6/1982 | Funaki et al. | 428/412 |
| 4,405,773 | 9/1983 | Loshaek et al. | 526/317 |
| 4,410,572 | 10/1983 | Sasama et al. | 427/407.1 |
| 4,411,932 | 10/1983 | Kwan | 427/164 |
| 4,442,177 | 4/1984 | Noda et al. | 428/412 |
| 4,490,495 | 12/1984 | Weber | 524/264 |
| 4,582,402 | 4/1986 | Knapp | 351/162 |
| 4,668,240 | 5/1987 | Loshaek | 8/507 |
| 4,857,072 | 8/1989 | Narducy et al. | 8/507 |
| 4,963,159 | 10/1990 | Narducy et al. | 8/507 |

FOREIGN PATENT DOCUMENTS 1395501 5/1975 United Kingdom.

Primary Examiner—Michael Lusignan
Attorney, Agent, or Firm—Warrick E. Lee, Jr.; Joseph Majka

[57] ABSTRACT

Novel colored contact lens and methods for preparation thereof are described. Binding of a color coat to the lenses is accomplished by use of compounds containing the functional groups $-CH_2-O-R^1$, wherein $R^1$ is hydrogen or $C_1$ to $C_{16}$ alkyl, and said $-CH_2-O-R^1$ groups are attached to a carbon atom that is part of an aromatic ring, or are attached to a nitrogen or oxygen atom.

17 Claims, No Drawings

COLOR BINDING MECHANISM FOR CONTACT LENSES

The present application is the U.S. National Application corresponding to International Application No. PCT/US 90/01868, filed Apr. 12, 1990 and designating the United States, which PCT application is in turn a continuation-in-part of copending U.S. Application Ser. No. 07/338,077, filed Apr. 14, 1989, now abandoned, the benefit of which is claimed pursuant to the provisions of 35 U.S.C. SS120, 363 and 365(c).

U.S. Pat. No. 4,668,240 (Loshaek) discloses colored contact lenses produced, in its preferred embodiment, from lens polymers and binding polymers containing the functional groups —OH and —COOH and an additional compound containing at least two groups per molecule of the group —NCO (isocyanate). U.S. Pat. application Ser. No. 124,724, filed Nov. 24, 1987, now U.S. Pat. No. 4,857,072 discloses a color binding mechanism that is different from that of Loshaek, but which also, in its preferred embodiment, requires an isocyanate compound.

Although lenses produced in accordance with the Loshaek patent's preferred embodiment are an enormous commercial success, their manufacture requires use of an isocyanate compound for binding the color to the lens. The isocyanate compound has several disadvantages. Its vapors are noxious and toxic if inhaled excessively. Thus it must be used with great caution. The isocyanate compound is very reactive chemically with active hydrogen groups such as —OH in the water molecule. Thus its concentrations can be wastefully reduced, if such molecules are present in the production environment. Its great reactivity also gives rise to pot-life problems, after it is added to the color coating compound. Thus, after the isocyanate compound is added to the color coating ink, the viscosity increases rapidly to a point where the ink must be discarded. The changing viscosity makes control of the coating process difficult and affects the quality of the coating.

The present invention, which does not require use of an isocyanate compound, has several advantages over Loshaek's preferred embodiment:

1. Handling noxious and toxic isocyanate compounds is not necessary.
2. It is possible to print hydrophilic lenses that are fully hydrated, which is not believed practical using ink containing isocyanate compounds.
3. The inks, containing no isocyanate compounds, have better pot life.
4. Ink viscosity is more stable and easier to control.

SUMMARY OF THE INVENTION

A first aspect of the invention may be summarized as a method for making a colored contact lens comprising the steps of:

a) providing a contact lens constructed of non-hydrophilic polymers having functional groups selected from at least one of —COOH, —OH, and —NH—R, wherein R is hydrogen or $C_1$ to $C_8$ alkyl or hydrophilic polymers;

b) coating at least a portion of a surface of the lens with a color coat comprising at least one pigment, binding polymer having functional groups selected from at least one of —COOH, —OH, and —NH—R, wherein R is hydrogen or $C_1$ to $C_8$ alkyl, and an adhesion promotor having at least two functional groups per molecule of the formula —$CH_2$—O—$R^1$ wherein $R^1$ is hydrogen or $C_1$ to $C_{16}$ alkyl, and said —$CH_2$—O—$R^1$ groups are attached to a carbon atom that is part of an aromatic ring, or attached to a nitrogen or oxygen atom;

c) subjecting the coated lens to conditions which cause the color coat to adhere to the lens.

Preferably, the lens polymer is hydrophilic and has functional groups selected from at least one of —COOH, —OH, and —NH—R, wherein R is hydrogen or $C_1$ to $C_8$ alkyl.

Also preferred is that the lens polymer and binding polymer are hydrophilic and are formed from monomers comprising at least one of acrylic acid, methacrylic acid, hydroxy $C_1$ to $C_6$ alkyl ester of acrylic acid and methacrylic acid, amino $C_1$ to $C_8$ alkyl ester of acrylic and methacrylic acid, glycerol esters of acrylic and methacrylic acid, and mixtures thereof.

More preferably, the lens polymer and binding polymers are formed from a mixture of monomers comprising hydroxyethyl methacrylate, ethoxyethyl methacrylate, and methacrylic acid.

Also preferred is that the lens polymer is hydrophilic and is formed from monomer comprising vinyl pyrrolidone and hydrophobic monomer.

Also preferred is that the adhesion promotor is

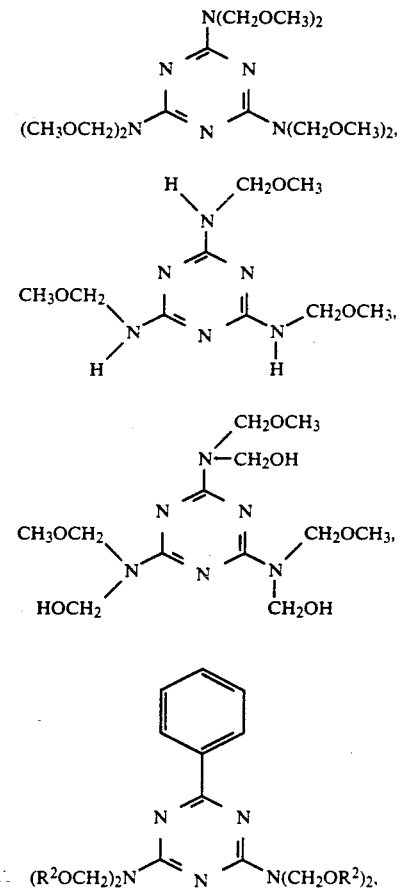

wherein $R^2$ is $CH_3$ or $C_2H_5$,

-continued

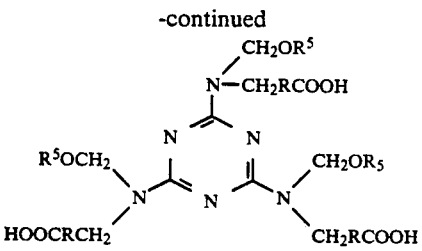

wherein R is a carbon-to-carbon single bond or $C_1$ to $C_6$ alkylene and $R^5$ is independently $C_1$ to $C_6$ alkyl,

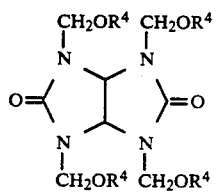

wherein each $R^4$ is independently H, $-CH_3$, $-C_2H_5$, $-C_3H_7$, or $-C_4H_9$,

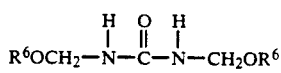

wherein each $R^6$ is independently H, $-CH_3$, or isobutyl, or

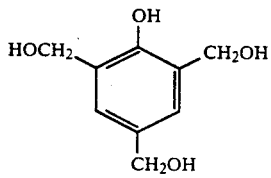

polymers thereof and combinations thereof.

A second aspect of the invention may be summarized as a method for making a colored contact lens comprising the steps of:

a) providing a contact lens constructed of non-hydrophilic polymers having functional groups selected from at least one of —COOH, —OH, and —NH—R, wherein R is hydrogen or $C_1$ to $C_8$ alkyl, or hydrophilic polymers;

b) coating at least a portion of a surface of the lens with a color coat comprising at least one pigment and adhesion promotor having functional groups of the formula $-CH_2-O-R^1$ wherein $R^1$ is hydrogen or $C_1$ to $C_{16}$ alkyl with said $-CH_2-O-R^1$ functional groups attached to a carbon atom that is part of an aromatic ring, or attached to a nitrogen or oxygen atom;

c) subjecting the coated lens to conditions which cause the color coat to adhere to the lens.

A third aspect of the invention may be summarized as a method for making a colored contact lens comprising the steps of:

a) providing a contact lens constructed of polymer having functional groups of the formula $-CH_2-O-R^1$ wherein $R^1$ is hydrogen or $C_1$ to $C_{16}$ alkyl with said $-CH_2-O-R^1$ functional groups attached to a carbon atom that is part of an aromatic ring or attached to a nitrogen or oxygen atom;

b) coating at least a portion of a surface of the lens with a color coat comprising at least one pigment and binding polymer having functional groups selected from at least one of the —COOH, —OH, and —NH—, R, wherein R is hydrogen or $C_1$ to $C_8$ alkyl, and c) subjecting the coated lens to conditions which cause the color coat to adhere to the lens.

A fourth aspect of the invention may be summarized as a method for making a colored contact lens comprising the steps of:

a) providing a contact lens constructed of polymer having functional groups of the formula $-CH_2-O-R^1$ wherein $R^1$ is hydrogen or $C_1$ to $C_{16}$ alkyl with said $-CH_2-O-R^1$ functional groups attached to a carbon atom that is part of an aromatic ring or attached to a nitrogen or oxygen atom;

b) coating at least a portion of a surface of the lens with a color coat comprising at least one pigment, binding polymer having functional groups of the formula $-CH_2-O-R^1$ wherein $R^1$ is hydrogen or $C_1$ to $C_{16}$ alkyl with said $-CH_2-O-R^1$ functional groups attached to a carbon atom that is part of an aromatic ring or attached to a nitrogen or oxygen atom, and an adhesion promotor having at least two groups per molecule selected from at least one of —COOH, —OH, and —NH—R, wherein R is hydrogen or $C_1$ to $C_8$ alkyl, and c) subjecting the coated lens to conditions which cause the color coat to adhere to the lens.

A fifth aspect of the invention may be summarized as a colored contact lens made by any of the four methods described above.

A sixth aspect of the invention may be summarized as a colored contact lens comprising:

a) a lens constructed of polymer;

b) pigment mixed with adhesion promotor on at least a portion of a surface of the lens;

wherein the adhesion promotor and lens polymer are bonded to each other by the reaction of first functional groups selected from at least one of —COOH, —OH, and —NH—R, wherein R is hydrogen or $C_1$ to $C_8$ alkyl with second functional groups of the formula $-CH_2-O-R^1$ wherein $R^1$ is hydrogen or $C_1$ to $C_{16}$ alkyl with said second functional groups attached to a carbon atom that is part of an aromatic ring or attached to a nitrogen or oxygen atom. Preferably, the lens polymer is formed from at least one monomer selected from acrylic acid, methacrylic acid, hydroxy $C_1$ to $C_8$ alkyl ester of acrylic acid or methacrylic acid, amino $C_1$ to $C_8$ alkyl ester of acrylic or methacrylic acid, glycerol ester of acrylic or methacrylic acid and mixtures thereof. Most preferably, the lens polymer is formed from at least one monomer selected from acrylic acid, methacrylic acid, and hydroxyethyl methacrylate.

A major advantage of this invention is that the compounds used as adhesion promotors or for the dual purpose of pigment binding and adhesion promotion, depend on a condensation, acid-base catalysis mechanism which differs from that of the isocyanate compounds of the prior art. Thus, while the isocyanate compounds are very reactive with even trace amounts of water or alcohol, the compounds of this invention are generally stable when water or alcohol are present in large quantities. This type of chemical reaction permits greater control of reaction speed and a wider range of compatibility, depending or the specific structure and reaction media, such are water, alcohol, and other active hydrogen compounds which present problems with the isocyanate compounds. The result is as much greater control of pot life and viscosity variation which can translate into improved product quality.

DETAILED DESCRIPTION OF THE INVENTION

The lenses colored by the first aspect of this invention may be constructed of non-hydrophilic polymer formed from hydrophobic monomers such as methyl methacrylate, t-butyl styrene (U.S. Pat. No. 4,228,269, Loshaek and Shen) or silicone polymer (e.g. U.S. Pat. No. 4,120,570, Gaylord) and hydrophilic monomers having functional groups selected from at least one of —COOH, —OH, and —NH—R, wherein R is hydrogen or $C_1$ to $C_8$ alkyl. The amount of hydrophilic monomers is not sufficient to render the lens hydrophilic, i.e., the lenses do not absorb a substantial amount of water and form hydrogels.

Alternatively the lenses colored by the first aspect of the invention may be constructed of hydrophilic polymer which has the functional groups —COOH, —OH, and/or —NH—R; or the hydrophilic polymer may be devoid of these functional groups. In either case, the hydrophilic polymers absorb substantial amounts of water to form hydrogels. Preferred hydrophilic polymers containing the functional groups are formed from, e.g. acrylic acid, methacrylic acid, hydroxy $C_1$ to $C_6$ alkyl esters of acrylic and methacrylic acid, (e.g. hydroxyethyl methacrylate and hydroxybutyl acrylate), amino $C_1$ to $C_8$ alkyl esters of acrylic and methacrylic acid (e.g. aminoethyl acrylate or N-ethyl amino methyl methacrylate), glycerol esters of acrylic and methacrylic acid, and mixtures thereof. Preferred hydrophilic lenses having the functional groups are disclosed in U.S. Pat. No. 4,405,773, (Loshaek) and are formed from a mixture of hydroxyethyl methacrylate, ethoxyethyl methacrylate and methacrylic acid. Preferred hydrophilic monomers not having the functional groups are disclosed in U.S. Pat. No. 4,158,089 (Loshaek) and are formed from vinyl pyrrolidone, which is a hydrophilic monomer, and hydrophobic monomers, such as alkyl esters of acrylic and methacrylic acid. Other contact lenses made of hydrophilic polymer that are substantially devoid of the functional groups —COOH, —OH, —NH—R, wherein R is hydrogen or $C_1$ to $C_8$ alkyl, —NCO, and epoxy are described in U.S. Pat. application Ser. No. 124,724 filed Nov. 24, 1987, now U.S. Pat. No. 4,857,072. Typical polymers of this type are produced by copolymerizing a hydrophilic vinyl heterocyclic monomer, such as N-vinyl pyrrolidone, N-succinimide, N-vinyl-e-caprolactam, vinyl pyridine, or N-vinyl glutarimide and a hydrophobic monomer such as styrene or $C_1$ to $C_8$ alkyl esters of acrylic or methacrylic acid, e.g. methyl methacrylate, ethyl methacrylate, methyl acrylate, etc. The lens polymer is typically cross-linked with a cross-linking agent such as diallyl itaconate, allyl methacrylate, or ethylene glycol dimethacrylate. Typical hydrophilic lenses devoid of the groups —OH, —COOH, and —NH—R, —NCO and epoxy are described in U.S. Pat. Nos. 4,158,089 (Loshaek), 4,182,802 (Loshaek), and British Patent No. 1,395,501 (National Research Development Corp.).

Hydrophilic lenses substantially devoid of the foregoing functional groups colored by this invention are preferably formed from monomers comprising hydrophilic monomer, such as N-vinyl pyrrolidone. The amount of N-vinyl pyrrolidone in the lens is preferably from about 50 to about 90 weight percent, more preferably from about 60 to about 80 weight percent and most preferably from about 65 to about 75 weight percent. If an N-vinyl heterocyclic hydrophilic momomer other than N-vinyl pyrrolidone is used, the above preferred weight percentages also apply. Generally, the amount of hydrophobic monomer employed in a lens is not sufficient to render the lens hydrophobic.

The term polymer means a material formed by polymerizing one or more monomeric compounds or a blend of such monomers. For polymers having functional groups, the functional groups project from the polymer backbone or from another group that projects from the backbone. For example, polymerized hydroxyethyl methacrylate may be represented by:

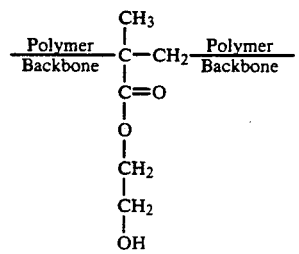

The hydroxyl functional group is at the bottom of the above representation.

Polymerization and lens shaping are well known in the art and are not part of this invention. Any of the well known techniques may be used.

To produce lenses in accordance with the first aspect of the invention a lens constructed of non-hydrophilic polymers having functional groups selected from at least one of —COOH, —OH, and —NH—R, wherein R is hydrogen or $C_1$ to $C_8$ alkyl or hydrophilic polymer is coated on at least a portion of its surface with a color coat comprising at least one pigment, binding polymer having functional groups selected from at least one of —OH, —COOH, and —NH—R, and an adhesion promotor having at least two functional groups of the formula —$CH_2$—O—$R^1$ wherein $R^1$ is hydrogen or $C_1$ to $C_{16}$ alkyl with said two functional groups per molecule of adhesion promotor attached to a carbon atom that is part of an aromatic ring or attached to a nitrogen or oxygen atom. The description of the binding polymer having the required functional groups is the same as that given previously for lens polymers having the functional groups.

The adhesion promotor having at least two groups of the formula —$CH_2$—O—$R^1$ per molecule of the adhesion promotor are generally formed by reaction of formaldehyde with various other compounds in the ratio of at least two molecules of formaldehyde per molecule of the other compounds. Preferred adhesion promotors, all of which are commercially available are:

A hexamethoxymethylmelamine resin sold as Cymel 301 ™ having the simplified structural formula

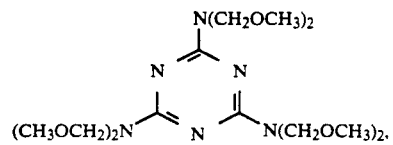

A methoxymethyl-imino melamine-formaldehyde resin sold as Cymel 327 ™ having the simplified structural formula

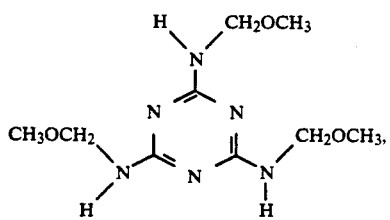

A methoxymethyl-methylol melamine-formaldehyde resin sold as Cymel 385 ™, having the simplified structural formula

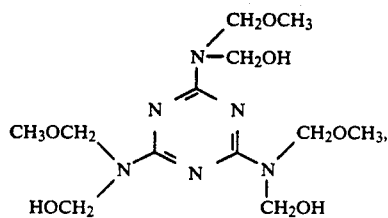

A methylated ethylated benzoquanamine having the simplified structural formula

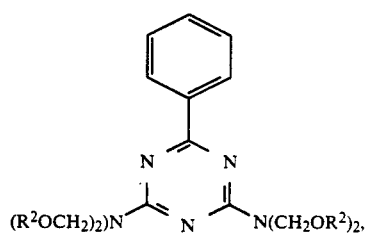

wherein each $R^2$ independently is —$CH_3$, —$CH_2CH_3$ or combinations thereof, sold as Cymel 1123 ™;

A methylated-isobutylated melamine-formaldehyde resin which contains acidic groups having the simplified structural formula

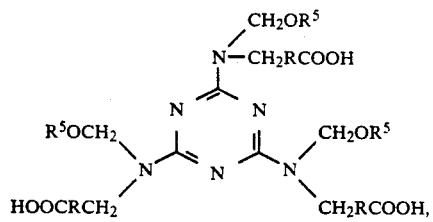

wherein R is independently a carbon-to-carbon single bond or $C_1$ to $C_6$ alkylene preferably methylene, and $R^5$ is independently $C_1$ to $C_6$, sold as Cymel 1141 ™;

A methylated ethylated or tetramethylol glycoluril resin having the simplified structural formula

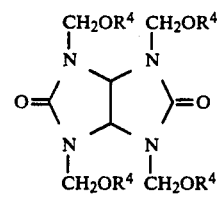

wherein each $R^4$ is independently H, —$CH_3$, or —$C_2H_5$ sold as Cymel 1171 ™ and Cymel 1172 ™

A methylated urea formaldehyde resin having the simplified formula

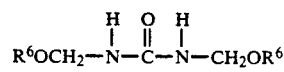

wherein $R^6$ is independently H, —$CH_3$, or isobutyl sold as Beetle 60 ™; and

Resole resin having the simplified formula

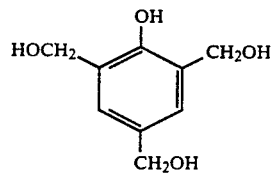

Cymel ™ resins and Beetle 60 ™ resin are available from The American Cyanamid Co., Wayne, N.J. Resole resins are available from Monomer-Polymer and Dajac Laboratories, Inc., Trevose, Pa.

All of the above compounds having at least two groups per molecule of —$CH_2$—O—$R^1$ are believed to be polymerized to a minor extent, hence each structural formula is described as being "simplified". For example Cymel 327 ™ may polymerize according to the reaction:

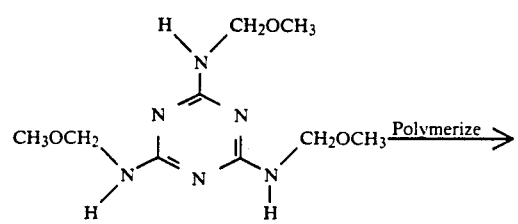

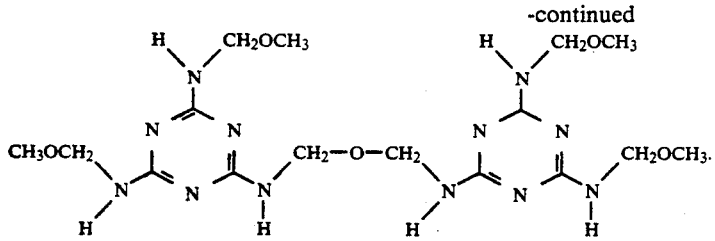
-continued

Even polymerized, such polymers will still contain at least two groups per molecule of $-CH_2-O-R^1$.

To achieve reactivity, the methylol (i.e. $CH_2OH$) or substituted methylol group is attached to an atom of nitrogen, oxygen, or to a carbon atom that is part of an aromatic ring. The aromatic ring is preferably a benzene ring, as in the resol resin compound, but other unsaturated rings may be used such as, rings of furan, pyrrole, imidazole, thiophene, thiazol, naphthalene, indole, purine, anthracene, phenanthrene, and the like.

To perform the coating step, the mixture of binding polymer having the required functional groups, pigment, additional compound having at least two groups per molecule of $-CH_2O-R^1$, and solvent is coated onto at least a portion of the front or rear surface of the lens. Although coating in a single step with this mixture is preferred, the coating step may be performed in two or more substeps, e.g. first coating the lens with a mixture of binding polymer, pigment, and solvent, and thereafter applying a coat of solvent and additional compound over the first coat.

The binding polymer, if used or when present, is preferably prepared by the same procedure described in Loshaek's U.S. Pat. No. 4,668,240, column 5, i.e., using a solution that contains the monomers that will be used to form the binding polymers, solvent for the monomer, a molecular weight modifier, and a polymerization initiator. Polymerization preferably is carried out in a heated reaction vessel. It should be noted, however that the solvent used in making the binding polymer, if any, in the present invention need not be constrained to molecules without active hydrogen groups, because of the aforementioned different reaction mechanisms for the adhesion promoter.

Suitable molecular weight modifiers include 2-mercaptoethanol, 1-dodecyl mercaptan, other alkyl mercaptans or extra solvent. Suitable polymerization initiators include free radical initiator such as 2,2'-azobis-(isobutyronitrile), benzoyl peroxide, t-butyl peroxybenzoate, and t-butyl peroxide. Suitable solvents include ethyl cellosolve, cyclopentanone, ethanol, t-butanol, acetone and other aliphatic and alicyclic ketones, ethyl lactate, and monomers used to make the binding polymer.

The choice of pigment is very flexible. Any coloring substance or combination thereof that provides a desired color may be used. Preferred pigments include (C.I. is the color index no.) for blue, phthalocyanine blue (pigment blue 15, C.I. 74160), cobalt blue (pigment blue 36, C.I. 77343); for green phthalocyanine green (Pigment green 7, C.I. 74260) and chromium sesquioxide; for yellow, red, brown, or black, various iron oxides; for violet, carbazole violet. of course, blends of such coloring substances are used to achieve the desired shade. For an opaque color coat, titanium dioxide or other opaquing agent may be used. opaquing agents, which are considered to be pigment within the present specification and claims, are blended with the other pigments into the color coat.

After coating, the lens is subjected to conditions that cause the color coat to adhere to the lens, thereby entrapping the pigment within the binding polymer in a manner that forms a colored contact lens. The coated lens, for example, may remain at ambient room temperature where most of the solvents are dried and then cured in an oven that may be purged with inert gas, e.g. nitrogen, and/or be under a partial vacuum. Of course, any conditions that bring about adhesion of the color coat may be used.

If the lens is constructed of a hydrophilic polymer, it is hydrated after curing by methods commonly used for uncolored lenses. The concentrations of ingredients in the color coat may vary quite widely, depending on the particular binding polymer and additional compound chosen. The examples provide specific formulations that may be used and the following table gives general ranges:

| Ingredient | WEIGHT PERCENT OF COMPONENTS IN COLOR COATS | |
|---|---|---|
| | Broad Range | Preferred Range |
| Pigment | 0.5–30 | 6.5–20 |
| Binding Polymer (including any residual unreacted monomer) | 0–50 | 13–25 |
| Additional Monomer | 0–50 | 15–30 |
| Adhesion Promotor with $\geq 2$ $-CH_2-O-R^1$ groups | 0.5–10 | 0.5–5 |
| Polymerization[1] Initiator | 0–1.0 | 0.05–0.5 |
| Acid Catalyst | 0–10 | 0–3 |
| Solvent[2] | Add to 100 percent | Add to 100 percent |

[1]Normally used only if the ink contains additional monomers.
[2]Includes solvent from solution polymerization of binding polymers, if solution polymerization was performed and solvents used in pigment grinding.

The following examples are intended to illustrate, but not limit, the invention. In these examples, the color coat is printed onto the lens and hence is termed "ink". Of course, other types of color coats, e.g. paints, may also be suitable.

PREPARATIVE EXAMPLE NO. 1

| PREPARATIVE EXAMPLE NO. 1 CLEAR CONTACT LENSES | | | |
|---|---|---|---|
| Lens Polymer Identification | L1 | L2 | L3 |
| Ingredient | Weight Fraction | | |
| Hydroxyethyl Methacrylate (HEMA) | .8838 | — | — |
| Ethoxyethyl Methacrylate (EOEMA) | .0982 | — | — |
| Methacrylic Acid (MAA) | .0170 | — | — |
| N,N-Dimethylacrylamide | — | — | .7068 |
| N-Vinyl Pyrrolidone | — | .7056 | — |
| Methyl Methacrylate | — | .2643 | .2623 |
| Isobutyl Acrylate | — | .0249 | .0249 |

PREPARATIVE EXAMPLE NO. 1
CLEAR CONTACT LENSES

| Lens Polymer Identification<br>Ingredient | L1 | L2 | L3 |
|---|---|---|---|
| | | Weight Fraction | |
| Diallyl Itaconate | — | .0016 | .0015 |
| Azobisisobutyronitrile | .0010 | — | — |
| 2,5-Dimethyl-2,5-Bis<br>(2-ethyl hexoylperoxy) Hexane | — | .0030 | .0030 |
| t-Butyl Peroxybenzoate | — | .0006 | .0015 |
| TOTAL | 1.0000 | 1.0000 | 1.0000 |

Preparation of Clear Lens L1

A mixture of all of the ingredients is degassed at about 0.1 millimeters of mercury (mmHg) for about 15 minutes and sealed in a glass tube and the tube is placed in a constant temperature water bath at 35 degrees Centigrade (°C.) for about 7 days. The tube is then transferred to an oven and the temperature is raised in steps to 90° C. over a period of about 48 hours. The oven is allowed to cool, and the tube is removed from the oven. The glass tube is broken and a rod of polymer is obtained. The polymer rod is cut into bonnets which are in turn machined into contact lenses by procedures well known in the art.

Preparation of Clear Lens L2

The ingredients were degassed at about 150 mmHg for about 15 minutes in a flask, then placed in a glass tube. The filled tube was capped and placed in a water bath for 72 hours at 20° C. and then for 96 hours (hrs.) at 30° C. The ingredients solidified during this time. The glass tube was removed from the water bath and subjected to the following treatment in an oven: 24 hrs. at 50° C., 4 hrs. at 70° C. and 24 hrs. at 110° C. The polymer was then removed from the glass tube and heated for 2 hrs. at 140° C. The polymer was formed into contact lenses by conventional methods.

Preparation of Clear Lens L3

Clear Lens L3 is prepared in substantially the same manner as described for clear lens L2 except the filled glass tubes were heated at 35° C. for 6 days in a water bath before subjecting to the oven treatment.

Lens L1, containing polymerized HEMA and MAA, has the functional groups —OH and —COOH. Neither Lens L2 or lens L3 has these functional groups. All three polymers are hydrophilic and swell in saline solution to form a so-called soft lens. However before swelling, they are printed with inks as described later.

PREPARATIVE EXAMPLE 2

PREPARATIVE EXAMPLE 2
BINDING POLYMER SOLUTION

| Solution Identification<br>Ingredient | S1<br>Weight Fraction |
|---|---|
| Hydroxyethyl Methacrylate | .3776 |
| Ethoxyethyl Methacrylate | .0416 |
| Methacrylic Acid | .0064 |
| Cyclopentanone | .5699 |
| Azobisisobutyronitrile | .0022 |
| 2-Mercaptoethanol | .0022 |
| Hydroquinone Monomethylether | .0001 |
| TOTAL | 1.0000 |

Polymerization Procedure

Binder polymerization was conducted by charging all the ingredients except hydroquinone monomethylether to a three neck flask equipped with a stirrer, nitrogen inlet, and an exhaust port. The flask was placed in a water bath held at 40° C. Nitrogen was passed over the slowly agitated solution.

The polymerization was sampled periodically until the viscosity measured between 20,000 and 40,000 centipoise (cps) on a Brookfield Viscometer with a number 3 spindle at 3 revolutions per minute (rpm). Hydroquinone monomethylether was added at this time. The product was then removed from the three neck flask and stored in a refrigerator.

In this case the binding polymer was prepared in solution by solution polymerization. Of course other methods of polymerization may be used, e.g. suspension or bulk polymerization.

PREPARATIVE EXAMPLE NO. 3

PREPARATIVE EXAMPLE NO. 3
INKS
Inks Containing Cymel 301 ™:

| Ink Identification<br>Ingredient | 1 | 2 | 3 | 4 |
|---|---|---|---|---|
| | | Weight Fraction | | |
| Hydroxyethyl Methacrylate | .2332 | .2139 | .2234 | .2276 |
| Ethoxyethyl Methacrylate | .0264 | .0242 | .0252 | .0258 |
| Methacrylic Acid | .0043 | .0040 | .0042 | .0042 |
| Azobisisobutyronitrile | .0013 | .0012 | .0013 | .0013 |
| Polymerized Binder Solution S1 | .5034 | .4616 | .4828 | .4956 |
| Ethyl Lactate | .1615 | .1481 | .1549 | .1590 |
| Phthalocyanine Blue | .0027 | .0025 | .0026 | .0026 |
| Titanium Dioxide | .0551 | .0506 | .0529 | .0543 |
| Cymel 301 ™ * | .0121 | .0939 | .0527 | .0254 |
| Catalyst 4040 ™ ** | — | — | — | .0042 |
| TOTAL | 1.0000 | 1.0000 | 1.0000 | 1.0000 |

*Cymel 301 ™ is a hexamethoymethylmelanine resin.
**Catalyst 4040 ™ is a 40% solution of toluene sulfonic acid in isopropanol added to activation solution.

Inks Containing Cymel 327 ™:

| Ink Identification<br>Ingredient | 5 | 6 | 7 | 8 |
|---|---|---|---|---|
| | | Weight Fraction | | |
| Hydroxyethyl Methacrylate | .2345 | .2145 | .2319 | .2140 |
| Ethoxyethyl Methacrylate | .0265 | .0243 | .0262 | .0242 |
| Methacrylic Acid | .0044 | .0040 | .0040 | .0037 |
| Azobisisobutyronitril | .0013 | .0012 | .0013 | .0012 |
| Polymerized Binder Solution S1 | .5037 | .4633 | .5003 | .4616 |
| Ethyl Lactate | .1616 | .1487 | .1605 | .1482 |
| Phthalocyanine Blue | .0027 | .0025 | .0026 | .0024 |
| Titanium Dioxide | .0552 | .0508 | .0548 | .0505 |
| Cymel 327 ™ * | .0101 | .0907 | .0184 | .0942 |
| Catalyst 4040 ™ ** | — | — | — | — |
| TOTAL | 1.000 | 1.000 | 1.000 | 1.000 |

*Cymel 327 ™ is a 90% solution in isobutanol of a methoxymethyl-imino melamine-formaldehyde resin.
**Catalyst 4040 ™ is a 40% solution of toluene sulfonic acid in isopropanol.

| Ingredient | 9 | 10 | 11 | 12 |
|---|---|---|---|---|
| | | Weight Fraction | | |
| Hydroxyethyl Methacrylate | .2243 | .2108 | .2212 | .2112 |
| Ethoxyethyl Methacrylate | .0254 | .0239 | .0250 | .0239 |
| Methacrylic Acid | .0042 | .0039 | .0041 | .0039 |
| Azobisisobutyronitrile | .0013 | .0012 | .0012 | .0012 |
| Polymerized | .4839 | .4555 | .4827 | .4595 |

-continued

| Bind Solution S1 | | | | |
|---|---|---|---|---|
| Ethyl Lactate | .1554 | .1462 | .1549 | .1475 |
| Phthalocyanine Blue | .0026 | .0024 | .0026 | .0024 |
| Titanium Dioxide | .0530 | .0499 | .0529 | .0503 |
| Cymel 327 TM * | .0384 | .0954 | .0528 | .0976 |
| Catalyst 4040 TM ** | .0115 | .0108 | .0026 | .0025 |
| TOTAL | 1.0000 | 1.0000 | 1.0000 | 1.0000 |

*Cymel 327 TM is a 90% solution in isobutanol of methoxymethyl-imino melamine-formaldehyde resin.
**Catalyst 4040 TM is a 40% solution of toluene sulfonic acid in isopropanol. In inks 9 and 10, catalyst 4040 was added to the activated ink paste. In inks 11 and 12 catalyst 4040 was added to the activation solution.

Inks Containing Cymel 385 TM:

| Ink Identification | 13 | 14 |
|---|---|---|
| Ingredient | Weight Fraction | |
| Hydroxyethyl-Methacrylate | .2315 | .2128 |
| Ethoxyethyl-Methacrylate | .0261 | .0240 |
| Methacrylic Acid | .0043 | .0040 |
| Azobisisobutyronitrile | .0013 | .0012 |
| Polymerized Binder Solution S1 | .5030 | .4629 |
| Ethyl Lactate | .1614 | .1486 |
| Phthalocyanine Blue | .0027 | .0025 |
| Titanium Dioxide | .0551 | .0507 |
| Cymel 385 TM * | .0119 | .0908 |
| Catalyst 4040 TM ** | .0027 | .0025 |
| TOTAL | 1.0000 | 1.0000 |

*Cymel 385 TM is an 80% solution in water of methoxymethyl-methylol melamine-formaldehyde resin.
** Catalyst 4040 TM is a 40% solution of toluene sulfonic acid in isopropanol added to the activation solution.

Inks Containing Cymel 1123 TM:

| Ink Identification | 15 | 16 |
|---|---|---|
| Ingredient | Weight Fraction | |
| Hydroxyethyl Methacrylate | .2311 | .2106 |
| Ethoxyethyl Methacrylate | .0261 | .0238 |
| Methacrylic Acid | .0043 | .0039 |
| Azobisisobutyronitrile | .0013 | .0012 |
| Polymerized Binder Solution S1 | .4981 | .4552 |
| Ethyl Lactate | .1598 | .1461 |
| Phthalocyanine Blue | .0027 | .0024 |
| Titanium Dioxide | .0546 | .0499 |
| Cymel 1123 TM * | .0111 | .0968 |
| Catalyst 4040 TM ** | .0109 | .0101 |
| TOTAL | 1.0000 | 1.0000 |

*Cymel 1123 TM is a methylated, ethylated benzoguanamine resin.
**Catalyst 4040 TM is a 40% solution of toluene sulfonic acid in isopropanol added to the activated ink paste.

Inks Containing Cymel 1141 TM:

| Ink Identification | 17 | 18 |
|---|---|---|
| Ingredient | Weight Fraction | |
| Hydroxyethyl Methacrylate | .2307 | .2106 |
| Ethoxyethyl Methacrylate | .0261 | .0238 |
| Methacrylic Acid | .0043 | .0039 |
| Azobisisobutyronitrile | .0013 | .0012 |
| Polymerized Binder Solution S1 | .4985 | .4563 |
| Ethyl Lactate | .1600 | .1463 |
| Phthalocyanine Blue | .0026 | .0024 |
| Titanium Dioxide | .0546 | .0500 |
| Cymel 1141 TM * | .0120 | .0922 |
| Catalyst 4040 TM ** | .0099 | .0133 |
| TOTAL | 1.0000 | 1.0000 |

*Cymel 1141 TM is an 85% solution in isobutanol of a methylated-isobutylated melamine-formaldehyde resin which contains acidic groups.
**Catalyst 4040 TM is a 40% solution of toluene sulfonic acid in isopropanol added to the activated ink paste.

Inks Containing Cymel 1171 TM:

| Ink Identification | 19 |
|---|---|
| Ingredient | Weight Fraction |
| Hydroxyethyl Methacrylate | .2308 |
| Ethoxyethyl Methacrylate | .0261 |
| Methacrylic Acid | .0043 |
| Azobisisobutyronitrile | .0013 |
| Polymerized Binder Solution S1 | .4963 |
| Ethyl Lactate | .1593 |
| Phthalocyanine Blue | .0026 |
| Titanium Dioxide | .0544 |
| Cymel 1171 TM * | .0147 |
| Catalyst 4040 TM ** | .0102 |
| TOTAL | 1.0000 |

*Cymel 1171 TM is a 95% solution in N-butyl alcohol of a methylated, ethylated glycoluril resin.
**Catalyst 4040 TM is a 40% solution of toluene sulfonic acid in isopropanol added to the activated ink paste.

Inks Containing Cymel 1172 TM:

| Ink Identification | 20 | 21 | 22 | 23 | 24 |
|---|---|---|---|---|---|
| Ingredient | Weight Fraction | | | | |
| Hydroxyethyl Methacrylate | .2211 | .2062 | .2328 | .2246 | .2134 |
| Ethoxyethyl Methacrylate | .0250 | .0233 | .0264 | .0254 | .0242 |
| Methacrylic Acid | .0042 | .0039 | .0043 | .0042 | .0040 |
| Azobisisoutyronitrile | .0013 | .0012 | .0013 | .0013 | .0012 |
| Polymerized Binder Solution S1 | .4768 | .4457 | .5039 | .4843 | .4607 |
| Ethyl Lactate | .1530 | .1430 | .1617 | .1554 | .1478 |
| Phthalocyanine Blue | .0025 | .0024 | .0027 | .0026 | .0024 |
| Titanium Dioxide | .0522 | .0488 | .0552 | .0531 | .0505 |
| Cymel 1172 TM * | .0490 | .0977 | .0117 | .0491 | .0958 |
| Catalyst 4040 TM ** | .0149 | .0278 | — | — | — |
| TOTAL | 1.0000 | 1.0000 | 1.0000 | 1.0000 | 1.0000 |

*Cymel 1172 TM is a 45% solution in water of tetramethylol glycoluril.
**Catalyst 4040 TM is a 40% solution of toluene sulfonic acid in isopropanol added to the activated ink paste.

Inks Containing Beetle 60 TM:

| Ink Identification | 25 | 26 | 27 | 28 | 29 |
|---|---|---|---|---|---|
| Ingredient | Weight Fraction | | | | |
| Hydroxyethyl Methacrylate | .2305 | .2240 | .2143 | .2285 | .2246 |
| Ethoxyethyl Methacrylate | .0261 | .0254 | .0243 | .0258 | .0255 |
| Methacryl Acid | .0043 | .0042 | .0040 | .0042 | .0042 |
| Azobisisobutyronitrile | .0013 | .0013 | .0012 | .0013 | .0013 |
| Polymerized Binder Solution S1 | .4975 | .4839 | .4635 | .4941 | .4878 |
| Ethyl Lactate | .1597 | .1552 | .1487 | .1585 | .1566 |
| Phthalocyanine Blue | .0026 | .0026 | .0025 | .0026 | .0026 |
| Titanium Dioxide | .0545 | .0530 | .0508 | .0541 | .0535 |
| Beetle 60 TM * | .0235 | .0504 | .0907 | .0309 | .0397 |
| Catalyst 4040 TM ** | — | — | — | — | .0042 |
| TOTAL | 1.0000 | 1.0000 | 1.0000 | 1.0000 | 1.0000 |

*Beetle 60 TM is a 85% solution in isopropyl alcohol of a methylated urea-formaldehyde resin.
**Catayst 4040 TM is a 40% solution of toluene sulfonic acid in isopropanol. In ink 29, catalyst 4040 was added to the activation solution.

Ink Containing Resole Resin (no polymerized binder solution added):

| Ink Identification | 30 |
|---|---|
| Ingredient | Weight Fraction |
| Polymerized Binder Solution S1 | .000 |
| Hydroxyethyl Methacrylate | .2246 |
| Ethoxyethyl Methacrylate | .0254 |
| Methacrylic Acid | .0043 |
| Azobisisobutyronitrile | .0013 |
| Resole* | .4863 |
| Ethyl Lactate | .1553 |
| Phthalocyanine Blue | .0026 |
| Titanium Dioxide | .0531 |
| Catalyst 4040 TM ** | .0471 |
| TOTAL | 1.0000 |

*Resole is a phenol-formaldehyde resin.
**Catalyst 4040 TM is a 40% solution of toluene sulfonic acid in isopropanol added to activated ink paste.

Preparation of Inks

The ethyl lactate, phthalocyanine blue and titanium dioxide were ground together in a ceramic ball mill until the particle size was less than 5 microns on a Hegman grind gauge to form a ground pigment mixture. At the end of the grind cycle the polymerized binder solution (or resole if used) was added to the ground mixture to form a paste. The remaining ingredients termed the "activation solution" were mixed with the paste to form an "activated ink paste". The activation solution contains hydroxyethyl methacrylate, ethoxyethyl methacrylate, methacrylic acid, azobisisobutyronitrile, adhesion promoter i.e. Cymel TM resin, and optionally an added catalyst such as Catalyst 4040 TM. When a catalyst is employed it can be added to the activation solution or to the activated ink paste to form the finished ink termed "ink".

EXAMPLES IN ACCORDANCE WITH THE FIRST ASPECT OF THE INVENTION

Lens Printing Procedure For Each Lens

The lenses were printed, i.e. a type of coating, with a colored dot pattern in accordance with U.S. Pat. No. 4,582,402, (Knapp).

For each ink and lens the ink was placed on a metal cliche containing an image formed by a pattern of recessed cells. Excess ink was removed from the cliche by wiping the surface with a doctor blade. Ink in the recessed image was removed by transferring it to a soft rubber pad which was pressed over the recessed image. Ink on the rubber pad was then transferred to a lens by contacting the inked part of the pad to a lens. Freshly printed lenses were heated up to 3 hours at 90° C. in a nitrogen atmosphere.

Adhesion Testing Procedure

Printed lenses were hydrated for 2 hours at 98° C. in a pH 8 saline solution. Hydrated lenses were examined to determine if any print pattern was removed during the hydration process. This is termed "test 1". A more severe test, "Test 2", was performed by mounting the printed side of the hydrated lens four inches from an air brush. The air brush was used to spray the lens for 30 seconds with methanol pressured at 40 pounds per square inch (psi) of nitrogen. After the air brush treatment, the lens was placed in pH 7.4 saline solution for 2-3 minutes.

The adhesion was considered not to pass (NP) if any coating came off during hydration in Test 1 or during the last saline treatment in Test 2. Otherwise the adhesion was considered to be passing (P). Adhesion test results are given below.

SUMMARY OF ADHESION TEST RESULTS FOR FIRST ASPECT OF THE INVENTION

| INK NO. | ADHESION PROMOTER Type | LEVEL IN INK (%) | CATALYST* LEVEL (%) | ADHESION TEST P = PASS; NP = NOT PASS LENS POLYMER | | | |
|---|---|---|---|---|---|---|---|
| | | | | L1 | | L2 | |
| | | | | Test 1 | Test 2 | Test 1 | Test 2 |
| 1 | CYMEL 301 TM | 1.21 | — | — | — | P | P |
| 2 | | 9.39 | — | — | — | P | P |
| 3 | | 5.27 | — | P | P | — | — |
| 4 | | 2.54 | 0.42 | P | P | — | — |
| 5 | CYMEL 327 TM | 1.01 | — | P | P | — | — |
| 6 | | 9.07 | — | P | P | — | — |
| 7 | | 1.84 | — | — | — | P | NP |
| 8 | | 9.42 | — | — | — | P | NP |
| 9 | | 3.84 | 1.15 | P | P | P | NP |
| 10 | | 9.54 | 1.08 | P | P | P | NP |
| 11 | | 5.28 | 0.26 | P | P | P | NP |
| 12 | | 9.76 | 0.25 | P | P | P | P |
| 13 | CYMEL 385 TM | 1.19 | 0.27 | P | P | P | NP |
| 14 | | 9.08 | 0.25 | P | P | P | NP |
| 15 | CYMEL 1123 TM | 1.11 | 1.09 | P | P | P | P |
| 16 | | 9.6S | 1.01 | P | P | P | P |
| 17 | CYMEL 1141 TM | 1.20 | 0.99 | ** | ** | ** | ** |
| 18 | | 9.22 | 1.33 | ** | ** | ** | ** |
| 19 | CYMEL 1171 TM | 1.47 | 1.02 | P | NP | P | NP |
| 20 | CYMEL 1172 TM | 4.90 | 1.49 | P | P | P | P |
| 21 | | 9.77 | 2.78 | P | P | P | P |
| 22 | | 1.17 | — | — | — | P | P |
| 23 | | 4.91 | — | — | — | P | NP |
| 24 | | 9.58 | — | — | — | P | NP |
| 25 | BEETLE 60 TM | 2.35 | — | — | — | P | P |
| 26 | | 5.04 | — | — | — | P | NP |
| 27 | | 9.07 | — | — | — | P | NP |
| 28 | | 3.09 | — | P | NP | — | — |
| 29 | | 3.97 | 0.42 | P | P | — | — |

*Catalyst 4040 TM (40%) toluene sulfonic acid in isopropanol).
**The inks gelled before they could be printed.

The print pattern on all lenses passed Test 1. Most print patterns with lens polymer L1 passed Test 2 and a fewer number of lens polymers L2 passed Test 2. The testing procedure of Test 2 wherein the lenses are sprayed with methanol is physically and chemically very harsh—more harsh than the normal rubbing to which the lenses would be subjected in normal use. Hence a lens which did not pass Test 2 does not necessarily indicate a useless lens, since such lenses were found to at least pass Test 1.

The vast majority of the lenses containing the functional groups —OH and —COOH (i.e. those constructed of lens polymer L1) passed Test 2. Exceptions were a lens printed with ink containing cymel 1171 TM (ink no. 19), and another lens printed with ink containing Beetle 60 TM (ink no. 28). It is believed that a higher amount of Cymel 1171 TM or Beetle 60 TM in the ink or a higher catalyst level would improve the result. At least one lens printed with inks containing the other additional compounds having the group —CH$_2$—O—R$^1$ passed the test.

As might be expected, as a group, more lenses that had functional groups i.e. L1 were found to pass both Test 1 and Test 2 than lenses that lack the functional groups —OH, —COOH, or —NH—R, i.e. lenses constructed of lens polymer L2. However at least one lens of the latter type passed the test when the additional compound in the ink was Cymel 301 TM, Cymel 327 TM, Cymel 1123 TM, Cymel 1172 TM, and Beetle 60 TM. This indicates that the invention is indeed viable for hydrophilic lenses that do not have the functional groups —OH, —COOH, or —NH—R.

Both inks containing Cymel 1141 TM gelled before they could be printed. It is believed that use of less catalyst, a different catalyst or no catalyst followed by overcoating the printed lens with a solution containing catalyst would overcome the gelling problem.

EXAMPLE IN ACCORDANCE WITH THE SECOND ASPECT OF THE INVENTION

The lens printing procedure and adhesion testing procedure were similar as to those used in the Examples for the First Aspect of the Invention except that no polymerized binder solution S1 was added to the ink used for printing. The results are as follows:

| | SUMMARY OF ADHESION TEST RESULTS FOR SECOND ASPECT OF THE INVENTION | | | | | | |
|---|---|---|---|---|---|---|---|
| | | | | ADHESION TEST P = PASS; NP = NOT PASS LENS POLYMER | | | |
| INK | ADHESION PROMOTER | | CATALYST | L1 | | L2 | |
| NO. | Type | LEVEL IN INK (%) | LEVEL (%) | TEST 1 | TEST 2 | TEST 1 | TEST 2 |
| 30 | RESOLE | 48.63 | 4.71 | P | P | P | NP |

The lens containing the functional groups —OH and —COOH (i.e., those constructed of lens polymer L1) passed both Test 1 and Test 2, while lens L2 without the functional groups —OH and —COOH only passed Test 1.

While the present invention has been described in conjunction with the specific embodiments set forth above, many alternatives, modifications and variations therefore will be apparent to those of ordinary skill in the art. All such alternatives, modifications and variations are intended to fall within the spirit and scope of the present invention.

I claim:

1. A method for making a colored contact lens comprising the steps of:
   a) providing a contact lens constructed of (1) non-hydrophilic polymers having functional groups selected from at least one of —COOH, —OH, and —NH—R, wherein R is hydrogen or C$_1$ to C$_8$ alkyl or (2) hydrophilic polymers;
   b) coating at least a portion of a surface of the lens with a color coat comprising at least one pigment, binding amount of binding polymer having functional groups selected from at least one of —COOH, —OH, and —NH—R, wherein R is hydrogen or C$_1$ to C$_8$ alkyl, and an adhesive amount of adhesion promotor having at least two functional groups per molecule of the formula —CH$_2$—O—R$^1$ wherein R$^1$ is hydrogen or C$_1$ to C$_{16}$ alkyl, and said —CH$_2$—O—R$^1$ groups are attached to a carbon atom that is part of an aromatic ring, or attached to a nitrogen or oxygen atom; and
   c) subjecting the coated lens to temperature, time and atmospheric conditions which cause the color coat to adhere to the lens.

2. The method of claim 1 wherein the lens polymer is hydrophilic and has functional groups selected from at least one of —COOH, —OH, and —NH—R, wherein R is hydrogen or C$_1$ to C$_8$ alkyl.

3. The method of claim 2 wherein the lens polymer and binding polymer are hydrophilic and are formed from monomers comprising at least one of acrylic acid, methacrylic acid, hydroxy C$_1$ to C$_6$ alkyl ester of acrylic acid and methacrylic acid, amino C$_1$ to C$_8$ alkyl ester of acrylic and methacrylic acid, glycerol esters of acrylic and methacrylic acid, and mixtures thereof.

4. The method of claim 3 wherein the lens polymer and binding polymers are formed from a mixture of monomer comprising hydroxyethyl methacrylate, ethoxyethyl methacrylate, and methacrylic acid.

5. The method of claim 1 wherein the lens polymer is hydrophilic and is formed from monomer comprising vinyl pyrrolidone and hydrophobic monomer.

6. The method of any one of claims 1 to 5 wherein the adhesion promotor has the simplified structural formula

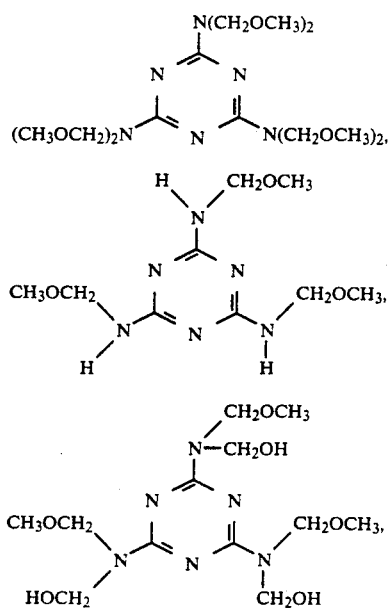

-continued

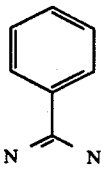

wherein $R^2$ is $CH_3$ or $C_2H_5$,

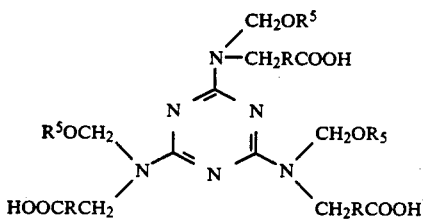

wherein R is a carbon-to-carbon single bond or $C_1$ to $C_6$ alkylene and $R^5$ is independently $C_1$ to $C_6$ alkyl,

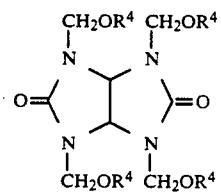

wherein each $R^4$ is independently H, $-CH_3$, $-C_2H_5$, $-C_3H_7$, or $-C_4H_9$,

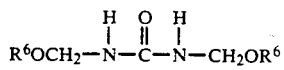

wherein each $R^6$ is independently H, $-CH_3$, or isobutyl, or

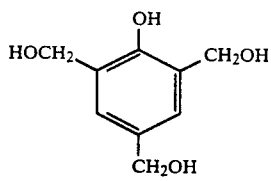

polymers thereof and combinations thereof.

7. A lens made by the method of any one of claims 1 to 5.

8. A lens made by the method of claim 6.

9. A method for making a colored contact lens comprising the steps of:
a) providing a contact lens constructed of (1) non-hydrophilic polymers having functional groups selected from at least one of $-COOH$, $-OH$, and $-NR-R$, wherein R is hydrogen or $C_1$ to $C_8$ alkyl or (2) hydrophilic polymers;
b) coating at least a portion of a surface of the lens with a color coat comprising at least one pigment, and adhesive amount of adhesion promotor having functional groups of the formula $-CH_2-O-R^1$ where $R^1$ is hydrogen or $C_1$ to $C_{16}$ alkyl, with said $-CH_2-O-R^1$ functional groups attached to a carbon atom that is part of an aromatic ring, or attached to a nitrogen or oxygen atom; and
c) subjecting the coated lens to temperature, time and atmospheric conditions which cause the color coat to adhere to the lens.

10. A lens made by the method of claim 9.

11. A method for making a colored contact lens comprising the steps of:
a) providing a contact lens constructed of polymers having functional groups of the formula $-CH_2-O-R^1$ wherein $R^1$ is hydrogen or $C_1$ to $C_{16}$ alkyl with said $-CH_2-O-R^1$ functional groups attached to a carbon atom that is part of an aromatic ring or attached to a nitrogen or oxygen atom;
b) coating at least a portion of a surface of the lens with a color coat comprising at least one pigment, and binding amount of binding polymer having functional groups selected from at lest one of $-COOH$, $-OH$, and $-NH-R$, where R is hydrogen or $C_1$ to $C_8$ alkyl, and
c) subjecting the coated lens to temperature, time and atmospheric conditions which cause the color coat to adhere to the lens.

12. A lens made by the method of claim 11.

13. A method for making a colored contact lens comprising the steps of:
a) providing a contact lens constructed of polymers having functional groups of the formula $-CH_2-O-R^1$ wherein $R^1$ is hydrogen or $C_1$ to $C_{16}$ alkyl with said $-CH_2-O-R^1$ functional groups attached to a carbon atom that is part of an aromatic ring or attached to a nitrogen or oxygen atom;
b) coating at least a portion of a surface of the lens with a color coat comprising at least one pigment, and binding amount of binding polymer having functional groups of the formula $-CH_2-O-R^1$ wherein $R^1$ is hydrogen or $C_1$ to $C_{16}$ alkyl with said functional groups attached to a carbon atom that is part of an aromatic ring or attached to a nitrogen or oxygen atom, and an adhesive amount of adhesion promotor having at least two groups per molecule selected from at least one of $-COOH$, $-OH$, and $-NH-R$, wherein R is hydrogen or $C_1$ to $C_8$ alkyl, and
c) subjecting the coated lens to temperature, time and atmospheric conditions which cause the color coat to adhere to the lens.

14. A lens made by the method of claim 13.

15. A colored contact lens comprising:
a) a lens constructed of polymer;
b) pigment mixed with adhesive amount of adhesion promoter on at least a portion of a surface of the lens,
wherein the adhesion promotor and lens polymer are bonded to each other by the reaction of first functional groups selected from at least one of $-COOH$, $-OH$, and $-NH-R$, wherein R is hydrogen or $C_1$ to $C_8$ alkyl with second functional groups of the formula $-CH_2-O-R^1$ wherein $R^1$ is hydrogen or $C_1$ to $C_{16}$ alkyl with said second functional groups attached to a carbon atom that is part of an aromatic ring or attached to a nitrogen or oxygen atom.

16. The colored contact lens of claim 15 wherein the lens polymer is formed from at lest one monomer selected from acrylic acid, methacrylic acid, hydroxy $C_1$ to $C_8$ alkyl ester of acrylic or methacrylic acid, amino $C_1$ to $C_8$ alkyl ester of acrylic or methacrylic acid, glycerol ester of acrylic or methacrylic acid, and mixtures thereof.

17. The lens of claim 15 wherein the lens polymer is formed from at least one monomer selected from acrylic acid, methacrylic acid, and hydroxyethyl methacrylate.

* * * * *